US008065237B2

(12) United States Patent
Bennett et al.

(10) Patent No.: US 8,065,237 B2
(45) Date of Patent: Nov. 22, 2011

(54) SYSTEMS AND METHODS FOR AGGREGATING PACKAGES IN A SHIPPING ENVIRONMENT

(75) Inventors: David Allison Bennett, Bothell, WA (US); Lynn Shaindell Goldhaber, Renton, WA (US); Lory Elizabeth Moon, Snoqualmie, WA (US); William W. Smith, III, Medina, WA (US)

(73) Assignee: United Parcel Service of America, Inc., Atlanta, GA (US)

( * ) Notice: Subject to any disclaimer, the term of this patent is extended or adjusted under 35 U.S.C. 154(b) by 432 days.

(21) Appl. No.: 12/099,594

(22) Filed: Apr. 8, 2008

(65) Prior Publication Data

US 2009/0254445 A1    Oct. 8, 2009

(51) Int. Cl.
*G06Q 30/00* (2006.01)
(52) U.S. Cl. ........................... 705/332; 705/330
(58) Field of Classification Search ............... 705/330, 705/332
See application file for complete search history.

(56) References Cited

U.S. PATENT DOCUMENTS

| | | |
|---|---|---|
| 4,128,204 A | 12/1978 | Wade |
| 5,694,551 A | 12/1997 | Doyle et al. |
| 5,712,789 A | 1/1998 | Radican |
| 5,758,329 A | 5/1998 | Wojcik et al. |
| 6,061,607 A | 5/2000 | Bradley et al. |
| 6,078,900 A | 6/2000 | Ettl et al. |
| 6,148,291 A | 11/2000 | Radican |
| 6,167,378 A | 12/2000 | Webber, Jr. |
| 6,249,774 B1 | 6/2001 | Roden et al. |
| 6,289,260 B1 | 9/2001 | Bradley et al. |
| 6,418,416 B1 | 7/2002 | Rosenberg et al. |
| 6,448,886 B2 | 9/2002 | Garber et al. |
| 6,529,797 B2 | 3/2003 | Williams et al. |
| 6,536,659 B1 | 3/2003 | Hauser et al. |
| 6,648,153 B2 | 11/2003 | Holmes |
| 6,721,762 B1 * | 4/2004 | Levine et al. ...................... 1/1 |

(Continued)

FOREIGN PATENT DOCUMENTS

WO    WO 01/18712 A1    3/2001

(Continued)

OTHER PUBLICATIONS

"DHL's New 'Break-Bulk-Express' Service Means Faster, More Convenient Shipping Across U.S.-Mexican Border", PR Newswire, Mar. 13, 2007.*

(Continued)

*Primary Examiner* — John Hayes
*Assistant Examiner* — Kevin Flynn
(74) *Attorney, Agent, or Firm* — Alston & Bird LLP

(57) ABSTRACT

Various embodiments for aggregating packages into a pouch in a shipping environment are disclosed. For example, package details associated with a package are compared to one or more incompatibility factors, and if the package details do not match the one or more incompatibility factors, a package identifier uniquely identifying the package is added to a pouch manifest. If the package is not compatible with the pouch, an error message may be displayed to a user indicating that the package is incompatible. In addition, package details may be compared with compatibility factors identifying criteria for packages that are compatible with the pouch and questionable compatibility factors identifying criteria for packages that may be compatible with the pouch. Compatibility factors and questionable compatibility factors may include, for example, service options, delivery notification options, or destination zip code(s).

25 Claims, 18 Drawing Sheets

U.S. PATENT DOCUMENTS

| | | | |
|---|---|---|---|
| 6,722,506 B1 * | 4/2004 | Nielsen et al. | 209/592 |
| 6,974,928 B2 | 12/2005 | Bloom | |
| 7,272,571 B2 | 9/2007 | Tuttrup et al. | |
| 7,355,505 B2 | 4/2008 | Bonner et al. | |
| 2001/0027471 A1 | 10/2001 | Paulose et al. | |
| 2001/0034673 A1 | 10/2001 | Yang et al. | |
| 2002/0010661 A1 | 1/2002 | Waddington et al. | |
| 2002/0016715 A1 | 2/2002 | Razumov | |
| 2002/0019759 A1 | 2/2002 | Arunapuram et al. | |
| 2002/0042735 A1 | 4/2002 | Narahara et al. | |
| 2002/0059121 A1 | 5/2002 | Schneider et al. | |
| 2002/0070846 A1 | 6/2002 | Bastian et al. | |
| 2002/0082954 A1 | 6/2002 | Dunston | |
| 2002/0099631 A1 | 7/2002 | Vanker et al. | |
| 2002/0107744 A1 | 8/2002 | Rosenberg et al. | |
| 2002/0107820 A1 | 8/2002 | Huxter | |
| 2002/0124389 A1 | 9/2002 | Matson | |
| 2002/0128957 A1 | 9/2002 | Rosenberg et al. | |
| 2002/0133415 A1 | 9/2002 | Zarovinsky | |
| 2002/0152128 A1 | 10/2002 | Walch et al. | |
| 2002/0175606 A1 | 11/2002 | Holmes | |
| 2002/0178074 A1 | 11/2002 | Bloom | |
| 2003/0037009 A1 | 2/2003 | Tobin et al. | |
| 2003/0083964 A1 | 5/2003 | Horwitz et al. | |
| 2003/0171948 A1 * | 9/2003 | Thomas et al. | 705/1 |
| 2003/0212602 A1 | 11/2003 | Schaller | |
| 2004/0107110 A1 * | 6/2004 | Gottlieb et al. | 705/1 |
| 2004/0128204 A1 | 7/2004 | Cihla et al. | |
| 2004/0153379 A1 | 8/2004 | Joyce et al. | |
| 2004/0243353 A1 * | 12/2004 | Aghassipour | 702/187 |
| 2005/0149373 A1 * | 7/2005 | Amling et al. | 705/8 |
| 2005/0154685 A1 * | 7/2005 | Mundy et al. | 705/404 |
| 2006/0173700 A1 * | 8/2006 | Fenelon | 705/1 |
| 2006/0224426 A1 * | 10/2006 | Goossens et al. | 705/8 |
| 2006/0253339 A1 * | 11/2006 | Singh et al. | 705/26 |
| 2007/0244677 A1 * | 10/2007 | Malitski et al. | 703/6 |

FOREIGN PATENT DOCUMENTS

| | | |
|---|---|---|
| WO | WO 02/07021 A2 | 1/2002 |

OTHER PUBLICATIONS

Notice of Allowance and Fees Due Dated May 5, 2008, for U.S. Appl. No. 10/357,971, filed Feb. 4, 2003.

About FedEx, FedEx Archives: 2003 Press Releases: FedEx Ground Launches FedEx Consolidated Return Service; Low-Cost, Convenient Service Meets High-Volume Return Needs of Customer-Direct Retailers; www.fedex.com/us; Mar. 13, 2008.

* cited by examiner 701a  700a

| RATES, SERVICES, & DELIVERY TIMES | | | | | | | [?] |
|---|---|---|---|---|---|---|---|
| (!) Auto Select: ⊙ Best Price<br>○ Fastest Delivery | | THU<br>16 DEC 04 | FRI<br>17 DEC 04 | MON<br>20 DEC 04 | TUE<br>21 DEC 04 | WED<br>22 DEC 04 | |
| ▼ Inter-Office Carrier | | | | | | | |
| 12:00 PM | 1 Business Day AM | $ TBD* | | | | | |
| END OF DAY | 1 Business Day | $ TBD* | | | | | |
| END OF DAY | 2 Business Days | | $ TBD* | | | | |
| END OF DAY | 3 Business Days | | | $ TBD* | | | |
| END OF DAY | No Specific Deadline | | | (!) $ TBD* | | | |
| ▼ FedEx | | | | | | | |
| 12:00 PM | Priority Overnight | $ 25.30 | | | | | |
| 4:30 PM | Standard Overnight | $ 21.62 | | | | | |
| END OF DAY | Ground | $ 4.91 | | | | | |
| 4:30 PM | 2 Day | | $ 10.94 | | | | |
| 4:30 PM | Express Saver | | | $ 10.38 | | | |
| ▼ UPS | | | | | | | |
| END OF DAY | Ground | $ 7.20 | | | | | |
| END OF DAY | Next Day Air | $ 29.55 | | | | | |
| END OF DAY | 2nd Day Air | | $ 14.75 | | | | |
| END OF DAY | 3 Day Select | | | $ 10.45 | | | |
| ▼ USPS | | | | | | | |
| END OF DAY | Express Mail | $ 21.05* | | | | | |
| END OF DAY | Parcel Post | | $ 4.11* | | | | |
| END OF DAY | Priority Mail | | $ 4.75* | | | | |

\* The delivery date is not guaranteed. The date shown is an estimate.

☑ Show Shipment Summary, Shipment Charges, and Billing Information

| YOUR SHIPMENT SUMMARY [?] | | SHIPMENT CHARGES [?] | |
|---|---|---|---|
| Ship Date: | Wed 15 Dec 2004 | Service: Inter-office Carrier 3 Business Days | TBD |
| Delivery By: | Mon 20 Dec 2004 End of Day | Options: E-mail Shipment Notification | N/A |
| Sender: | Lory Krett | E-mail Delivery Notification | N/A |
| Recipient: | Milne Fruit<br>Prosser, WA 99350-1267 | Total: | $ TBD** |
| Packaging | Carrier Box<br>3 lbs | ** The final charge will be based on the service selected and the number of items included in the pouch. | |
| Drop-Off: | BELLEVUEPSS<br>iShip, Inc.<br>Mailroom<br>Bellevue, WA 98006 | BILLING [?] | |
| | | Type: | |
| Shipment Type: | BUSINESS | Company Account (Prepaid) | |
| Reference: | -- | Billing Information: | |
| Options: | Shipment Notification, E-mail<br>Delivery Notification, E-mail | N/A | |

Pro-rate Rating

FIG. 7A

| RATES, SERVICES, & DELIVERY TIMES | | | | | | | ? |
|---|---|---|---|---|---|---|---|
| ⓘ Auto Select: ⊙ Best Price<br>○ Fastest Delivery | | THU<br>16 DEC 04 | FRI<br>17 DEC 04 | MON<br>20 DEC 04 | TUE<br>21 DEC 04 | WED<br>22 DEC 04 | |
| ⬇ Inter-Office Carrier | | | | | | | |
| 12:00 PM | 1 Business Day AM | $ 1.00* | | | | | |
| END OF DAY | 1 Business Day | $ 1.00* | | | | | |
| END OF DAY | 2 Business Days | | $ 1.00* | | | | |
| END OF DAY | 3 Business Days | | | $ 1.00* | | | |
| END OF DAY | No Specific Deadline | | ⓘ $ 1.00* | | | | |
| ▽ FedEx | | | | | | | |
| 12:00 PM | Priority Overnight | $ 25.30 | | | | | |
| 4:30 PM | Standard Overnight | $ 21.62 | | | | | |
| END OF DAY | Ground | $ 4.91 | | | | | |
| 4:30 PM | 2 Day | | $ 10.94 | | | | |
| 4:30 PM | Express Saver | | | $ 10.38 | | | |
| ⬇ UPS | | | | | | | |
| END OF DAY | Ground | $ 7.20 | | | | | |
| END OF DAY | Next Day Air | $ 29.55 | | | | | |
| END OF DAY | 2nd Day Air | | $ 14.75 | | | | |
| END OF DAY | 3 Day Select | | | $ 10.45 | | | |
| ▽ USPS | | | | | | | |
| END OF DAY | Express Mail | $ 21.05* | | | | | |
| END OF DAY | Parcel Post | | $ 4.11* | | | | |
| END OF DAY | Priority Mail | | $ 4.75* | | | | |

* The delivery date is not guaranteed. The date shown is an estimate.

☑ Show Shipment Summary, Shipment Charges, and Billing Information

| YOUR SHIPMENT SUMMARY | ? | SHIPMENT CHARGES | ? |
|---|---|---|---|
| Ship Date: Wed 15 Dec 2004<br>Delivery By: Mon 20 Dec 2004 End of Day<br>Sender: Lory Krett<br>Recipient: Milne Fruit<br>Prosser, WA 99350-1267<br>Packaging: Carrier Box<br>3 lbs<br>Drop-Off: BELLEVUEPSS<br>iShip, Inc.<br>Mailroom<br>Bellevue, WA 98006<br>Shipment Type: BUSINESS<br>Reference: --<br>Options: Shipment Notification, E-mail<br>Delivery Notification, E-mail | | Service: Include in a Pouch 3 Business Days 1.00<br>Options: E-mail Shipment Notification N/A<br>E-mail Delivery Notification N/A | |
| | | Total: $ 1.00 | |
| | | BILLING | ? |
| | | Type:<br>Company Account (Prepaid)<br>Billing Information:<br>N/A | |

Custom Rate Rating

FIG. 7B

| iShip | Shipment Details INTER-OFFICE CARRIER | 1 pkg |

SHIPPING ADDRESSES

| Sender: | Recipient: | Drop Off Location: |
|---|---|---|
| iShip, Inc.<br>Jane Doe<br>3545 Factoria Blvd SE<br>Suite 100<br>HR Department<br>Bellevue, WA 98006-0000<br>(425) 602-5020<br>lory@iship.com<br>Business | iShip, Inc.<br>Accounting / Jane Smith<br>12020 Main St<br>Suite 500<br>Seattle, WA 98006-0000<br>(425) 602-4848<br>accounting@iship.com<br>Business | iShip, Inc.<br>Mainroom #A-342<br>3545 Factoria Blvd SE<br>Suite 100<br>Bellevue, WA 98006-0000<br>(425) 602-4848<br>Drop Off Deadline:<br>Include in Pouch 2:00 PM |

SHIPMENT INFORMATION

Package Info: Letter
1.08 lbs / LTR weight billed
Ship Date: Mon 3 Mar 2003
Deliver By: Tue 4 Mar 2003 End of Day
Description: Year end data Shipment ID: MUOCCCCJRDRV9
Shipment Ref 1: ACCT-00334
Shipment Ref 2: --
Options: E-mail Delivery Notification
E-mail Shipment Notification

SHIPMENT CHARGES

| Service: Inter-office Carrier 1 Business Day | TBD |
| Options: E-mail Shipment Notification | 0.00 |
| E-mail Delivery Notification | 0.00 |
| Total: | $ TBD** |

** The final charge will be based on the service selected and the number of items included in the pouch.

BILLING
Type:
Company Account (Prepaid)
Billing Info:
N/A

HOW TO USE THIS TRAVELER™ LABEL
DO NOT PHOTOCOPY
THIS TRAVELER LABEL IS NOT A SHIPPING LABEL
1. Use the Print button in your browser to print this page to your printer.
2. Affix the Traveler Label (below) to your package.
3. Take your package and traveler label to the mailroom where shipment processing will be completed.

FIG. 8

Define Items — 1405

Ship To: — 1400
ACME Headquarters
New York, NY 10101-5432  1401

Ship Date: — 1406
Wed 23 Jun 2004

Service and Delivery: — 1407
UPS Next Day Air
Thu 24 2004 10:30 AM (expected)

Items Included: — 1408
18

Item List — 1402

| iShip ID | Sender | Ship To | Chargecode | Requested Delivery Date |
|---|---|---|---|---|
| MUOCCCCJRDRW0 | Bill Jackson | NEW YORK, NY 10101-5432 | AV00876 | Thu 24 Jun 2004 10:30 AM |
| MUOCCCCJRDRW1 | BILL WHITE | NEW YORK, NY 10101-5432 | MM88765 | Thu 24 Jun 2004 EOD |
| MUOCCCCJRDRW2 | Jane Doe | NEW YORK, NY 10101-5432 | PERSONAL | No Deadline |
| MUOCCCCJRDRW3 | Jane Doe | NEWARK, NJ 07103-4567 | WK87112 | Thu 24 Jun 2004 8:30 AM |
| MUOCCCCJRDRW4 | James Watson | NEW YORK, NY 10101-5432 | AV00876 | Fri 25 Jun 2004 EOD |
| MUOCCCCJRDRW5 | Jim Smith | NEW YORK, NY 10101-5432 | AV00876 | No Deadline |
| MUOCCCCJRDRW6 | Jim Williams | NEW YORK, NY 10101-5432 | MM77320 | Thu 24 Jun 2004 EOD |
| MUOCCCCJRDRW7 | Stacy Berg | NEW YORK, NY 10101-5432 | MM44310 | Thu 24 Jun 2004 EOD |
| MUOCCCCJRDRW8 | STEPHANIE WILLIAMSON | NEW YORK, NY 10101-5432 | MM36650 | No Deadline |
| MUOCCCCJRDRW9 | STEPHANIE WILLIAMSON | NEW YORK, NY 10101-5432 | AV00876 | No Deadline |

Sender:
ACME Corp.
Bill Jackson
12020 101st Ave NE
Ste 400
Seattle, WA 98101-1234
(206) 555-1234
bjackson@acme.com
☑ Business
☑ Exact Match Recipient:
ACME Corporation
Sal Hanson / Mailstop C33
1234 MAIN ST
STE 1600
NEW YORK, NY 10101-5432
(555) 555-1189
shanson@acme.com
☑ Business
☑ Exact Match Packaging: Letter
1.25 lbs / LTR weight billed
Service: UPS Next Day Air
Ship Date: Wed 23 Jun 2004
Delivery: Thu 24 Jun 2004 10:30 AM (expected)
Billing: Company Account (Prepaid)
iShip ID: MUOCCCCJRDRV0
ShpmntRef1: AV00876
ShpmntRef2: ---
Options: E-mail Delivery Notification
E-mail Shipment Notification NOTE: The purple highlighted details indicates that the item might need to be shipped individually or placed in a different pouched shipment.

Add... — 1404

Remove from Pouch — 1403

Ok    Cancel

SYSTEMS AND METHODS FOR AGGREGATING PACKAGES IN A SHIPPING ENVIRONMENT

BACKGROUND OF THE INVENTION

To reduce overhead costs and/or costs to their customers, senders, such as retailers and business enterprises, may look for a shipping carrier that can deliver their packages in the shortest delivery timeframe and for the lowest cost. Web-based shipping systems, such as those provided by iShip, Inc., and locally-run shipping systems, such as the ConnectShip system offered by UPS, display various carriers that are available to ship a package (e.g., depending on the location of the sender and the recipient) and the delivery services (e.g., next day, second day, ground) provided by each carrier. In addition, the systems provide the estimated costs and the expected delivery date for each delivery service.

Another method of reducing shipping costs is to consolidate shipments. For example, FedEx and UPS offer customers the ability to consolidate shipments destined for European Union (EU) countries under one international air waybill, clear customs through one port of entry in one shipment, and be delivered to multiple recipients located in the EU countries. These solutions consolidate shipments based on the destination country of each shipment, but they do not take into consideration other shipping parameters for each shipment when consolidating the shipments.

Accordingly, there is a need in the art for improved systems and methods for consolidating shipments.

BRIEF SUMMARY OF VARIOUS EMBODIMENTS OF THE INVENTION

Various embodiments of the invention provide systems and methods for identifying two or more compatible packages to consolidate into a pouch in a shipping environment. For example, a system according to one embodiment includes a processor configured for: (1) receiving package details associated with a package to be shipped to an ultimate recipient; (2) retrieving a pouching template from a memory that identifies one or more incompatibility factors for a pouch; (3) comparing the package details with the incompatibility factors identified in the pouching template; and (4) in response to the package details not matching one or more of the incompatibility factors, electronically adding a unique identifier associated with the package to a pouch manifest. In one embodiment, the system displays a message indicating that the package should not be added to the pouch in response to the package details matching at least one of the incompatibility factors.

In various other embodiments, the pouching template may further define questionable compatibility factors, and the system processor may compare package details with the questionable compatibility factors. In response to the package details matching one or more of the questionable compatibility factors and not matching the incompatible factors, the system may add the package identifier to the pouch manifest and flag it for further consideration by the user. For example, in one embodiment, the package identifier may be highlighted in the pouch manifest. As another example, in one embodiment, the system may prompt the user to confirm that the package identifier should be added to the pouch manifest.

According to a further embodiment, the pouching template may also define one or more compatibility factors, and the system processor may compare package details with the one or more compatibility factors. In response to one or more of the package details matching one or more of the compatibility factors and not matching the incompatibility factors, the system may add the package identifier to the pouch manifest.

In other various embodiments, a pouching system for identifying two or more packages to add into a pouch in a shipping environment is provided. The system includes: (1) a compatibility module configured for comparing package details associated with a package to pouch criteria associated with a pouch to determine whether the package is incompatible with the pouch and (2) an item addition module configured for electronically adding a package identifier identifying the package to a pouch manifest associated with the pouch in response to the package details not matching any of the criteria.

According to another embodiment, a method of adding two or more packages to a pouch in a shipping environment is provided. The method includes the steps of: (1) displaying to an original sender a list of carriers and one or more delivery services available for each carrier for shipping a package, the list of carriers including a generic carrier representing a preference to ship the package in a pouch; (2) receiving a selection of the generic carrier to ship the package; (3) in response to receiving the selection of the generic carrier, comparing package details associated with the package with one or more incompatibility factors associated with the pouch; and (4) in response to the package details not matching any of the one or more incompatibility factors, adding a package identifier associated with the package to a pouch manifest associated with the pouch.

According to another embodiment, a system is provided for identifying one or more carriers and delivery service options for delivering a package in a shipping environment. The system includes a processor configured for: (1) receiving at least a portion of package details associated with a package to be shipped to an ultimate recipient; (2) retrieving a pouching template from a memory that identifies one or more incompatibility factors for a pouch; (3) comparing the package details received with the incompatibility factors identified in the pouching template; (4) in response to the package details not matching one or more of the incompatibility factors, displaying a first list of carriers and delivery service options selectable by a user for shipping the package, wherein the first list includes an option to ship the package in a pouch; and (5) in response to the package details matching one or more of the incompatibility factors, displaying a second list of carriers and delivery service options selectable by the user for shipping the package, wherein the second list does not include an option to ship the package in a pouch.

BRIEF DESCRIPTION OF DRAWINGS

Figure 1:
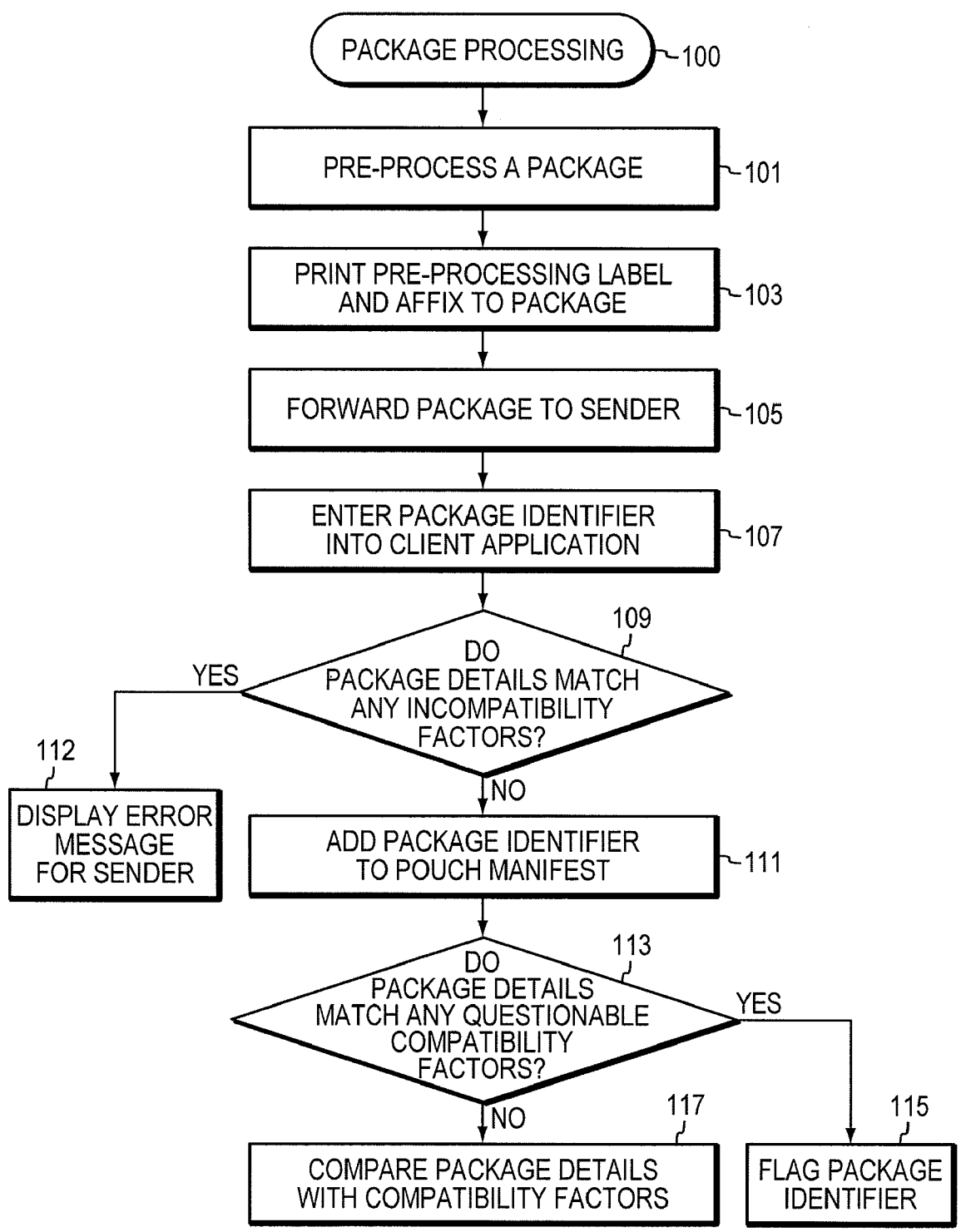

Having thus described the invention in general terms, reference will now be made to the accompanying drawings, which are not necessarily drawn to scale, and wherein:

FIG. 1 is a flow diagram illustrating a package processing method according to various embodiments.

Figure 2:
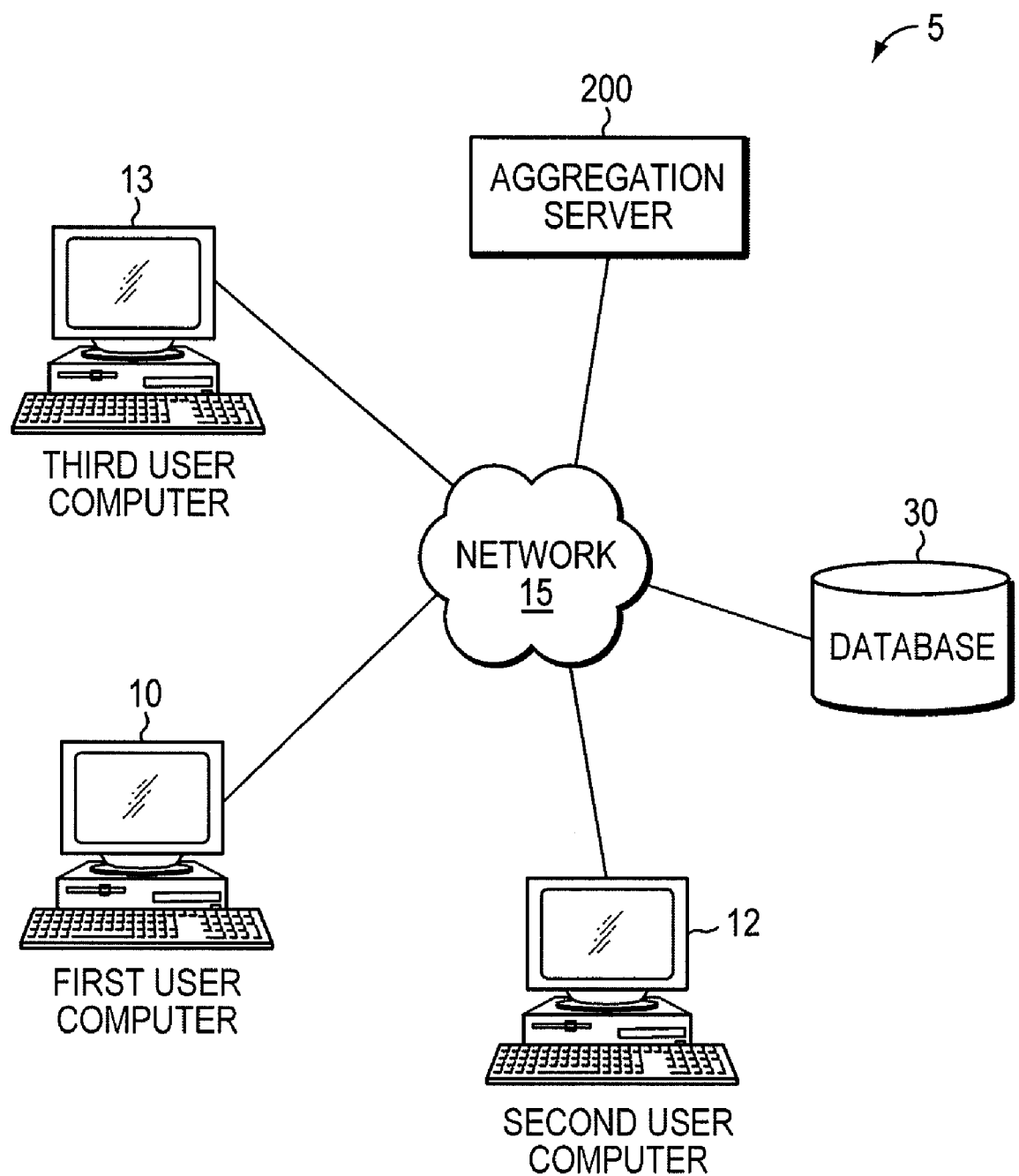

FIG. 2 is a simplified block diagram illustrating an aggregation system according to one embodiment.

Figure 3:
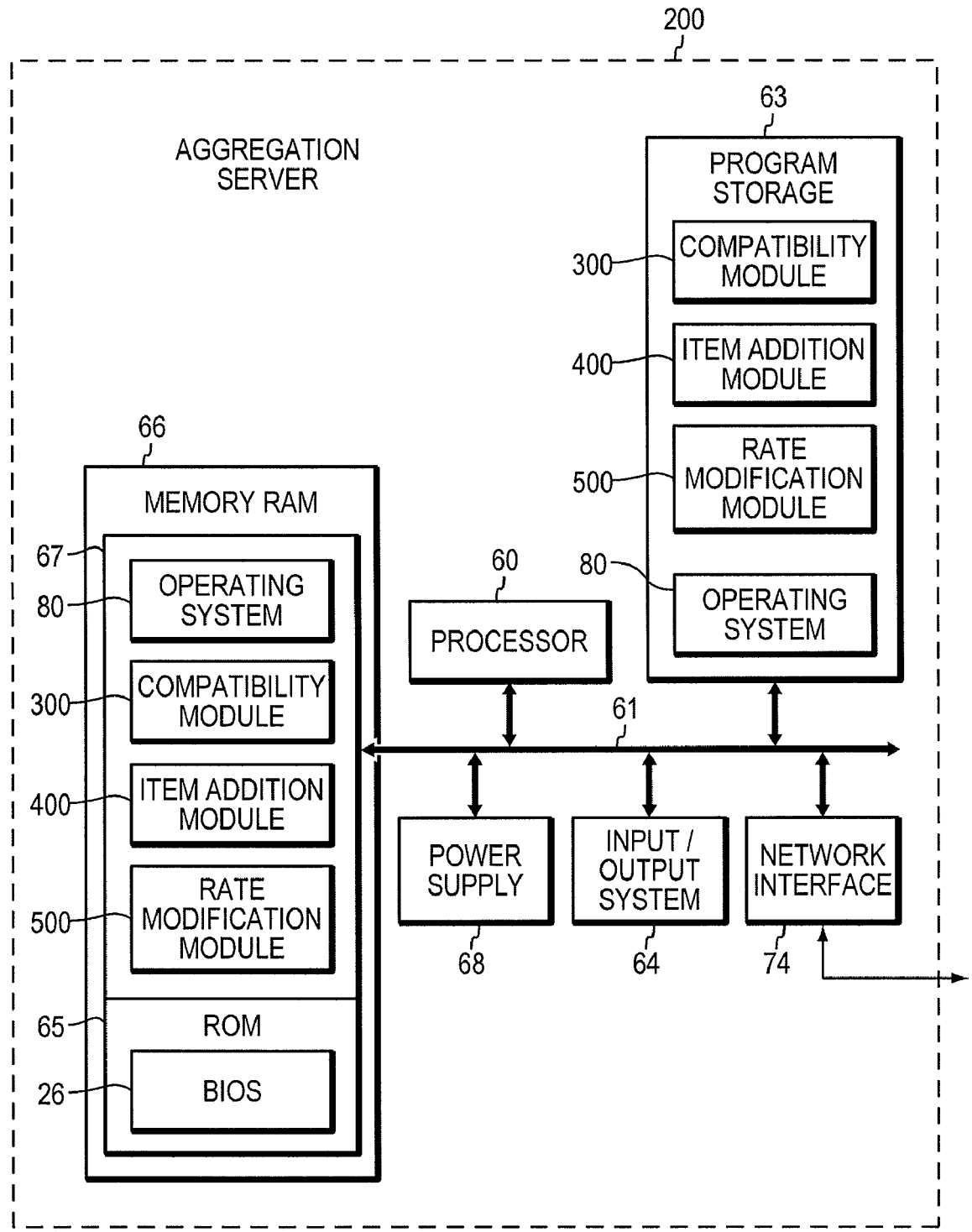

FIG. 3 is a schematic diagram of an aggregation server according to various embodiments.

Figure 4:
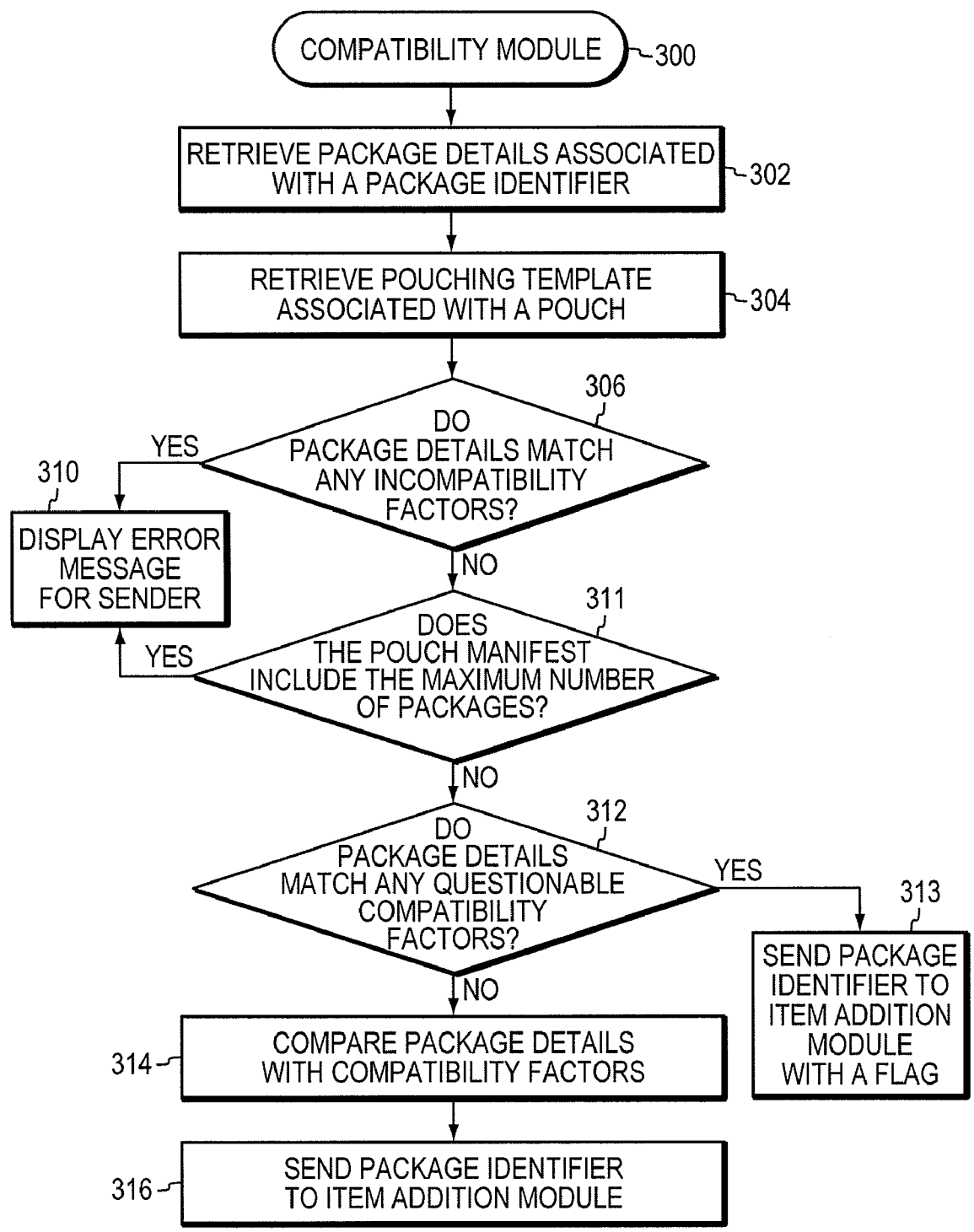

FIG. 4 is a flow diagram illustrating the steps executed by a compatibility module according to various embodiments.

Figure 5:
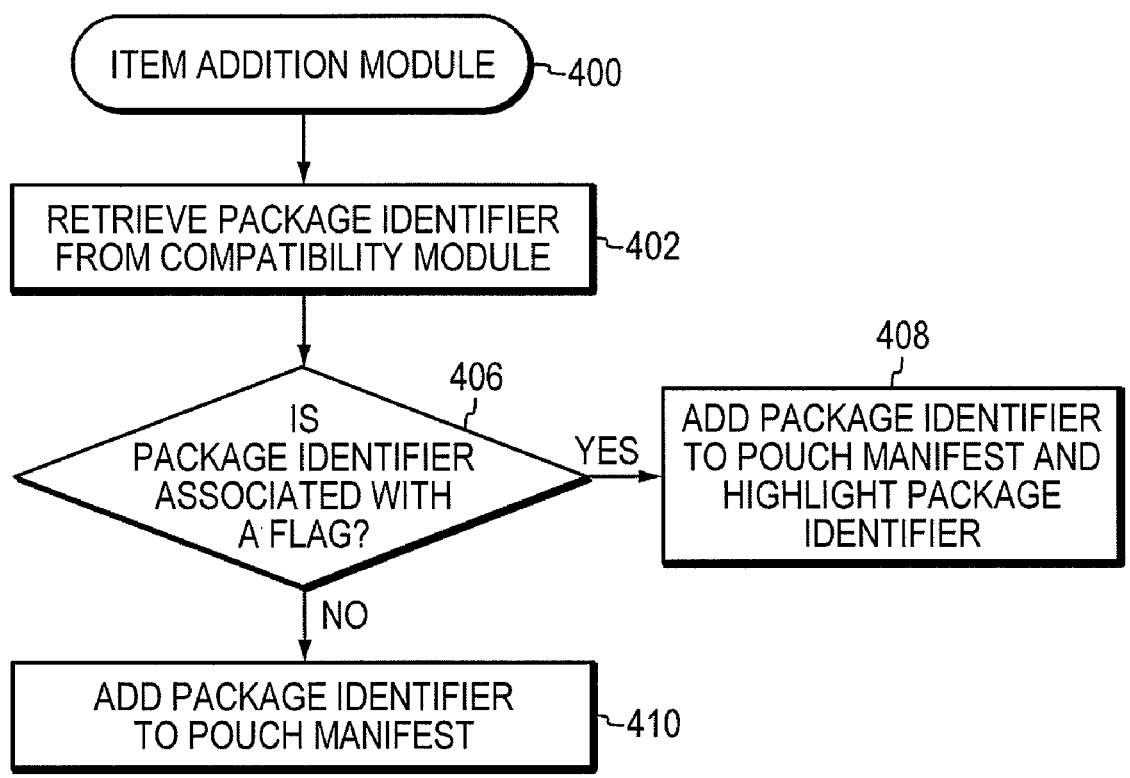

FIG. 5 is a flow diagram illustrating the steps executed by an item addition module according to various embodiments.

Figure 6:
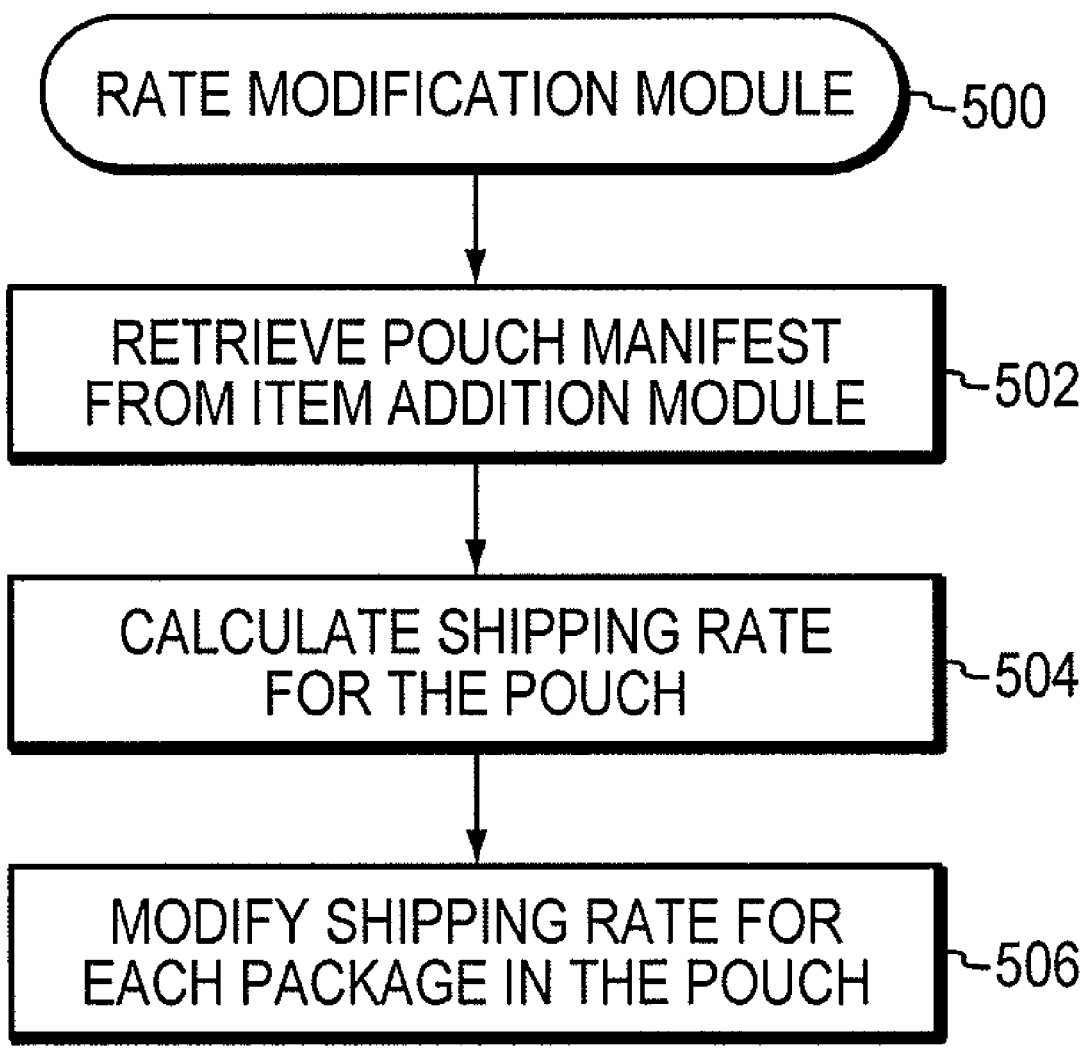

FIG. 6 is a flow diagram illustrating the steps executed by a rate modification module according to various embodiments.

FIGS. 7A-16 illustrate exemplary user interface dialog boxes according to various embodiments.

Figure 17:
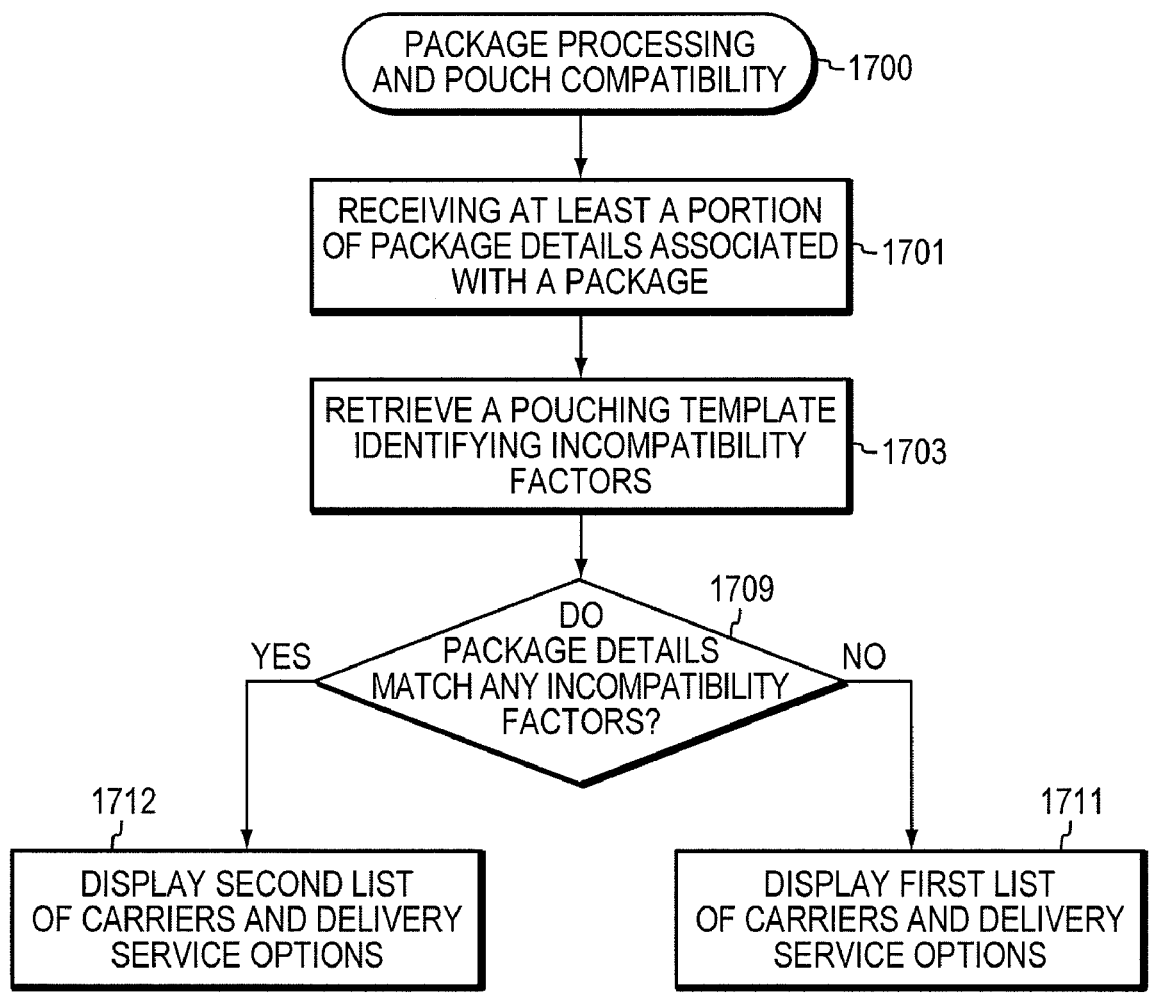

FIG. 17 is a flow diagram illustrating a package processing method according to an alternative embodiment.

DETAILED DESCRIPTION OF VARIOUS EMBODIMENTS OF THE INVENTION

Various embodiments of the present invention now will be described more fully with reference to the accompanying drawings, in which some, but not all embodiments of the invention are shown. Indeed, various embodiments of the invention may be embodied in many different forms and should not be construed as limited to the embodiments set forth herein. Like numbers refer to like elements throughout.

As will be appreciated by one skilled in the art, various embodiments of the present invention may be embodied as a method, a data processing system, or a computer program product. Accordingly, various embodiments of the present invention may take the form of an entirely hardware embodiment, an entirely software embodiment, or an embodiment combining software and hardware aspects. Furthermore, various embodiments of the present invention may take the form of a computer program product on a computer-readable storage medium having computer-readable program instructions (e.g., computer software) embodied in the storage medium. More particularly, various embodiments of the present invention may take the form of web-implemented computer software. Any suitable computer-readable storage medium may be utilized including hard disks, CD-ROMs, optical storage devices, or magnetic storage devices.

Various embodiments of the present invention are described below with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks. Accordingly, blocks of the block diagrams and flowchart illustrations support combinations for performing the specified functions, combinations of steps for performing the specified functions, and program instructions for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

System Architecture

An aggregation system 5 in a shipping environment according to one embodiment is shown in FIG. 2. As may be understood from this figure, in this embodiment, the system 5 includes one or more user computers 10, 12, 13 that are connected, via a network 15 (e.g., a LAN or the Internet), to communicate with an aggregation server 200. In a particular embodiment, the first and second user computers 10, 12 are pre-processor computers for use by original senders, and the third user computer 13 is a pouch processing computer for use by a sender. In one embodiment of the invention, the aggregation system 5 is configured for retrieving data from and storing data to a database 30 that may be stored on (or, alternatively, stored remotely from) the aggregation server 200.

FIG. 3 is a schematic diagram of the aggregation server 200 according to various embodiments. The aggregation server 200 includes a processor 60 that communicates with other elements within the aggregation server 200 via a system interface or bus 61. Also included in the aggregation server 200 is a display device/input device 64 for receiving and displaying data. This display device/input device 64 may be, for example, a keyboard or pointing device that is used in combination with a monitor. The aggregation server 200 further includes memory 66, which preferably includes both read only memory (ROM) 65 and random access memory (RAM) 67. The server's ROM 65 is used to store a basic input/output system 26 (BIOS), containing the basic routines that help to transfer information between elements within the aggregation server 200.

In addition, the aggregation server 200 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a compatibility module 300, an item addition module 400, and a rate modification module 500. The compatibility module 300, the item addition module 400, and the rate modification module 500 control certain aspects of the operation of the aggregation server 200, as is described in more detail below, with the assistance of the processor 60 and an operating system 80.

Also located within the aggregation server 200 is a network interface 74, for interfacing and communicating with other elements of a computer network. It will be appreciated by one of ordinary skill in the art that one or more of the aggregation server 200 components may be located geographically remotely from other aggregation server 200 components. Furthermore, one or more of the components may be combined, and additional components performing functions described herein may be included in the aggregation server 200.

Brief Overview of Exemplary System Flow

Various embodiments of the present invention provide systems and methods for processing a package and evaluating whether the package is compatible with a pouch. In addition, various embodiments of the invention provide for the display of an option to include a package in a pouch and the corresponding delivery services and costs available along with a list of available carriers and the delivery services and costs available for each carrier.

According to various embodiments, the term "pouch" refers to a fully enclosed container that can contain other packages of various types (e.g., boxes, letter envelopes, bags, etc.). In addition, the pouch can be any soft or hard sided packaging appropriate for the types of packages to be included in the pouch and/or available for a carrier.

For example, FIG. 1 illustrates an exemplary flow 100 of a method of processing a package in a business enterprise shipping environment and evaluating the package for compatibility with a pouch according to one embodiment. Beginning at Step 101, an original sender pre-processes a package for shipping to an ultimate recipient, which is the person or entity designated to receive the package at the package's final destination. To pre-process a package, the original sender may access a first client application, such as the web-based Desktop Shipping Station (DSS) application or the Customer Entry Station (CES) application provided by iShip, Inc. (see www.iship.com), via a computing device and select package details for the package. Exemplary package details include the type of package (e.g., letter, small box, large box, etc.), the ultimate recipient's address, a preferred delivery date and time, a preferred shipping date and time, a preferred carrier or list of carriers (e.g., UPS, FedEx, DHL, USPS), one or more service options (e.g., signature requirements upon delivery, proof of delivery, declared value of package, hold for pickup, return receipt, etc.), and one or more billing options (e.g., pre-paid, cash-on-delivery (COD), etc.). The list of carriers may include a generic carrier that represents the option to ship the package in a pouch if the package is not incompatible with the pouch.

Next, at Step 103, a pre-processing label is printed, and the original sender affixes the label to the package. The label includes thereon a unique package identifier that identifies the package, and the package details associated with the package are stored in a memory with the package identifier. The package is then forwarded to a sender, such as mailroom personnel or counter personnel at a shipping store, to complete the processing of the package, which is shown in Step 105.

In Step 107, the sender receives the package and enters the package identifier into a second client application, such as the web-based Professional Shipping Station (PSS) application or Counter Manifest System (CMS) application provided by iShip, Inc. (see www.iship.com), via a computing device, and the package identifier is transmitted to an aggregation application. The package identifier may be entered, for example, by scanning the label or manually entering the package identifier printed on the label. In response to receiving the package identifier, the one or more package details associated with the package are compared to one or more incompatibility factors stored in a pouching template by an aggregation application, which is shown in Step 109. The incompatibility factors identify criteria about a package that would make it incompatible for including in a pouch. For example, a package may be incompatible with a pouch if one or more address fields are missing, the billing option selected is not a pre-paid option, hold for pickup service option is selected, or a return receipt is requested. If the package details do not meet any of the incompatibility factors, the package is considered to be compatible, and the package identifier is electronically added to a manifest for the pouch, as shown in Step 111. However, if the package details meet one or more of the incompatibility factors, the package identifier is not added to the manifest and an error message is displayed for the sender, as shown in Step 112. In addition, in a particular embodiment (not shown in FIG. 1), the aggregation application may also check whether the addition of the package to the pouch would cause the pouch to exceed a maximum number of packages (or maximum size/weight) set for the pouch. In such an embodiment, if the package would cause the pouch to exceed the maximum number of packages (or maximum size/weight) set for the pouch, an error message may be displayed for the sender.

Although the first and second client applications and the aggregation application are described above as being separate from each other, in various other embodiments, two or more applications may be combined into one application. In addition, although the first and second client applications are described above as being web-based, the applications may be executed locally on the computing device of each user according to various other embodiments.

The pouching template may further identify questionable compatibility factors, which are details about a package that may be compatible with a pouch but may warrant further consideration by the sender. For example, a package may be compatible with a pouch, but the sender may not want to include the package in the pouch if the delivery date and time selected for the package is prior to the delivery date and time of the pouch, the shipping date and time selected for the package is prior to the shipping date and time of the pouch, the zip+4 code for the package does not match the zip+4 code of the pouch, or certain service options are selected for the package (e.g., signature requirement upon delivery, no signature required upon delivery, or proof of delivery). Accordingly, as shown in Step 113, the package details may be compared with questionable compatibility factors. In response to the package details matching one or more questionable compatibility factors and not meeting any of the incompatibility factors, the package identifier is flagged for additional consideration by the sender, which is shown as Step 115. In one embodiment, the package identifier is electronically added to the pouch manifest, but the identifier is highlighted for the sender (e.g., change font size or color, include color around the font). In another embodiment, a dialog box is displayed alerting the sender about the one or more package details that are questionable and requesting that the sender confirm whether the package identifier should be included in the pouch manifest.

In a further embodiment, the pouching template may also identify compatibility factors, which are details about a package that are compatible with a pouch. For example, a package may be compatible if the original sender selected to receive a delivery notification by email. Accordingly, as shown in Step 117, the package details may be compared with one or more compatibility factors.

Detailed Description of Exemplary System Flow

As discussed above in relation to FIG. 3, the aggregation server 200 according to various embodiments includes: (1) a compatibility module 300, which automates the process of determining whether a package is compatible with a pouch; (2) an item addition module 400, which adds a package identifier to a pouch manifest if the package is not incompatible with the pouch; and (3) a rate modification module 500, which automates the modification of the shipping rates associated with each package included in the pouch. These modules are discussed below in more detail in relation to FIGS. 4-6. In addition to providing the above-mentioned modules, one embodiment of the aggregation system 5 further provides various graphical user interfaces that facilitate the entry of information into the aggregation system 5 and allow users to view package details and the manifest for the pouch. Exemplary graphical user interfaces that may be displayed by the aggregation system 5 are discussed below in relation to FIGS. 7A-16.

Compatibility Module

FIG. 4 is a flow diagram illustrating the steps executed by the compatibility module 300 in accordance with one embodiment. The compatibility module 300 begins at Step 302 by retrieving package details associated with a package identifier entered by the sender. The package details are stored with the package identifier after they are input by the original sender during the package pre-processing process. Next, at Step 304, the compatibility module 300 retrieves a pouching template associated with a pouch. The pouching template includes one or more incompatibility factors for the pouch.

At Step 306, the compatibility module 300 compares one or more of the package details with the one or more incompatibility factors defined in the pouching template. Incompatibility factors identify characteristics about a package that would be incompatible with the pouch. For example, a package may be incompatible with a pouch if one or more address fields are missing, the billing option selected is not a pre-paid option, hold for pickup service option is selected, or a return receipt option is requested. In addition, in various embodiments, the incompatibility factors in the pouching template may be set according to the business rules of the carriers available to or used by the sender and/or the business rules of the sender. For example, the incompatibility factors set up for a company that uses UPS and DHL as carriers may be different from the incompatibility factors set up for another company that uses FedEx and USPS as carriers. Furthermore, according to various embodiments, the incompatibility factors may be changed to reflect changes in the carrier's or the sender's business rules.

If any of the package details for the package match one or more of the incompatibility factors, then the compatibility module 300 generates and displays an error message indicating that the package is incompatible with the pouch, as shown in Step 310. If the package details for the package do not match any of the incompatibility factors, the compatibility module 300 proceeds to Step 311 and determines if the pouch manifest includes the maximum number of packages set for the pouch. If the maximum number of packages has been included in the pouch, the compatibility module 300 proceeds to Step 310. In other various embodiments (not shown), the compatibility module 300 determines if the pouch would exceed a set size and/or weight if the package is included in the pouch, and if so, the compatibility module 300 proceeds to Step 310.

If the maximum number of packages has not been included in the pouch manifest (or the maximum pouch size and/or weight would not be exceed if the package is included in the pouch), the compatibility module 300 compares one or more of the package details to one or more questionable compatibility factors, which is shown as Step 312. For example, a package may be compatible with a pouch, but the sender may not want to include the package in the pouch if the delivery date and time selected for the package is prior to the delivery date and time of the pouch, the shipping date and time selected for the package is prior to the shipping date and time of the pouch, the zip+4 code for the package does not match the zip+4 code of the pouch, or certain service options are selected for the package (e.g., signature requirement upon delivery, no signature required upon delivery, or proof of delivery). If one or more of the package details matches one or more of the questionable compatibility factors, the compatibility module 300 associates a flag with the package identifier and sends the package identifier and the flag to the item addition module 400, which is shown in Step 313. According to various embodiments, the flag may be a value indicating which package detail(s) match one of the questionable compatibility factors.

As noted above with respect to the incompatibility factors, the questionable compatibility factors may be set according to the business rules of the carriers available to or used by the sender and/or the business rules of the sender, and the questionable compatibility factors may be changed to reflect changes in the carrier's or the sender's business rules.

In one embodiment, if the package details do not match any of the questionable compatibility factors or the incompatibility factors, the compatibility module 300 compares the package details to one or more compatibility factors, shown as Step 314, and transmits the package identifier to the item addition module 400, shown as Step 316. Compatibility factors may be associated with the pouch to promote certain flags or attributes from the package level to the pouch level. For example, the pouch template may include "delivery notification by email" as a compatibility factor, and any packages for which delivery notification by email has been selected will be considered compatible with the pouch. When the pouch is delivered, an email will be sent to the email addresses specified for receiving delivery notification. In another example, the pouch template may specify a particular "signature required" level (e.g., no signature required, a signature required, or adult signature required) as a compatibility factor, and any packages having the particular signature required level will be considered compatible with the pouch. When the pouch is delivered, the requisite signature level will be requested of the person receiving the delivery. In yet another example, the pouch template may include a particular zip code (or zip+4 code) as a compatibility factor, and any packages intended for delivery in the particular zip code (or zip+4 code) will be considered compatible with the pouch. Accordingly, specifying compatibility factors for the pouch advances preferences and delivery instructions associated with the packages to the pouch level so the preferences and delivery instructions can be executed at the pouch level (e.g., sending delivery notifications when the pouch is delivered, obtaining a signature upon delivery of the pouch).

Furthermore, as noted above with respect to the incompatibility factors and questionable compatibility factors, the compatibility factors may be set according to the business rules of the carriers available to or used by the sender and/or the business rules of the sender, and the compatibility factors may be changed to reflect changes in the carrier's or the sender's business rules.

Although Step 314 is shown as being executed after Steps 306, 311, and 312, Step 314 may be executed substantially simultaneously with or prior to Steps 306, 311, and/or 312, according to various other embodiments. In addition, Step 312 may be executed substantially simultaneously with or prior to Steps 306 and/or 311, according to various other embodiments. Similarly, Step 311 may be executed substantially simultaneously with or prior to Step 306.

Item Addition Module

FIG. 5 is a flow diagram illustrating the steps performed by the item addition module 400 in accordance with various embodiments of the present invention. The item addition module 400 begins at Step 402 by retrieving (or receiving) a package identifier from the compatibility module 300 for adding to a pouch manifest. Next, at Step 406, the item addition module 400 determines whether the package identifier is associated with a flag. If the package identifier is associated with a flag, the item addition module 400 adds the package identifier to the pouch manifest and highlights the package identifier and/or the package details, which is shown in Step 408. For example, if the package identifier is associated with a flag, the font of the package identifier and/or the package details displayed for the sender may be a different color or size or the area surrounding the package identifier and/or the package details may be a different color. If the package identifier is not associated with a flag, the item addition module 400 adds the package identifier to the pouch manifest, which is shown as Step 410.

In various other embodiments (not shown), if the package identifier is associated with a flag, the item addition module 400 may display a dialog box for the user to confirm whether the package identifier should be added to the pouch manifest. If the item addition module 400 receives confirmation from the user that the package identifier should be added to the pouch manifest, the item addition module 400 adds the package identifier to the pouch manifest.

Rate Determination Module

FIG. 6 is a flow diagram illustrating the steps performed by the rate modification module 500 in accordance with various embodiments of the present invention. The rate modification module 500 begins at Step 502 by retrieving (or receiving) the pouch manifest from the item addition module 400. The rate modification module 500 then calculates the shipping rate for the pouch, which is shown as Step 504. Step 504 may be performed as each package is added to the pouch manifest (or shortly thereafter) or after all of the packages to be included in the pouch are added to the pouch manifest. The shipping rate for the pouch may be based on the number of packages to be included in the pouch as indicated by the pouch manifest, the estimated weight and/or size of the pouch based on the pouch manifest, the destination of the packages, the destination of the pouch, the ultimate recipients of the packages, the recipient of the pouch, and/or the carrier service selected to transport the pouch and/or the packages, according to various embodiments of the invention. In response to calculating the shipping rate for the pouch, the rate modification module 500 then proceeds to Step 506 to modify the shipping rate associated with each package to be included in the pouch. In one embodiment, the shipping rate for each package is determined by dividing the shipping rate for the pouch by the number of packages in the pouch. In other embodiments, the shipping rate for each package may be a function of the weight and/or size of each package relative to the total weight and/or size of the pouch. Step 506 may be performed as each package identifier is added to the pouch manifest (or shortly thereafter) or after all of the package identifiers to be included in the pouch manifest are added to the pouch manifest.

Furthermore, in one embodiment in which two or more of the packages have different ultimate recipients located remotely from each other, the shipping rate for each package may include the cost of shipping the package to a first location at which the package is removed from the pouch and the cost of shipping the package to the ultimate recipient from the first location.

Exemplary System Operation

In various embodiments, an original sender accesses a pre-processing application via the Internet using the original sender's desktop computer or other personal computing device located at the original sender's place of business or home. In an alternative embodiment, the original sender may access the pre-processing application using a kiosk or other public computing device located at a shipping store (e.g., UPS Store, FedEx Kinko's, U.S. Post Office).

As mentioned above, to pre-process a package, the original sender may access a first client application, such as the web-based Desktop Shipping Station application or the Customer Entry Station application provided by iShip, Inc., via a computing device and select package details for the package. Exemplary package details include the type of package (e.g., letter, small box, large box, etc.), the ultimate recipient's address, a preferred delivery date and time, a preferred shipping date and time, a preferred carrier or list of carriers (e.g., UPS, FedEx, DHL, USPS), one or more service options (e.g., signature requirements upon delivery, proof of delivery, declared value of package, hold for pickup, return receipt, etc.), and one or more billing options (e.g., pre-paid, cash-on-delivery (COD), etc.). After the package details have been selected, a pre-processing label is printed, and the original sender affixes the label to the package. The label includes thereon a unique package identifier that identifies the package, and the package details associated with the package are stored in a memory with the package identifier.

FIGS. 7A and 7B illustrate two exemplary carrier selection dialog boxes 700a, 700b, respectively, that may be displayed to the original sender. The dialog boxes 700a, 700b list carriers, services, rates, and delivery times available for a particular package. In a particular embodiment, the dialog box 700a, 700b displays services, rates, and delivery times associated with a generic carrier to represent the option of including the package within a pouch, and a name associated with the generic carrier may be displayed as a heading along with other specific carriers in the dialog box 700a, 700b. For example, available services, delivery times, and rates for shipping the package in a pouch are listed under the heading 701a "Inter-Office Carrier" in FIG. 7A and the heading 701b "Include in a Pouch" in FIG. 7B. According to one embodiment, the sender (or a system administrator) specifies the heading to be displayed for the generic carrier and the types of services available for packages that are to be added to a pouch. In addition, the rates for shipping packages in pouches may be pro-rated, as shown in FIG. 7A, or customized, as shown in FIG. 7B. If the rates are pro-rated, they are determined upon completion of the pouch by the rate modification module 400, according to various embodiments, based on the cost of shipping the pouch and the number (and/or weight/size) of packages to be shipped in the pouch. However, if the rates are customized, the shipping rate for each package is determined prior to pouching.

In response to the original sender selecting a service provided by the generic carrier, which indicates the original sender wants the package included in a pouch and delivered by the estimated delivery time associated with the selected service, a pre-processing label is printed, and the label is affixed to the package. An exemplary pre-processing label 800 is shown in FIG. 8. According to various embodiments, the label 800 includes the name 801 associated with the generic carrier, the original sender's name 802, the ultimate recipient's name and at least part of the address 803, the type of package (e.g., letter, box) 804 and the package's weight and/or size, the requested delivery date and time 805 (e.g., a specific time of the day or a general time such as "end of day" or "before noon"), a package identifier 806, and any delivery notification options selected 807. In addition, the package details selected for the package are transmitted to the aggregation server 200 and are stored in a memory (e.g., a database) with the package identifier.

Figure 9:
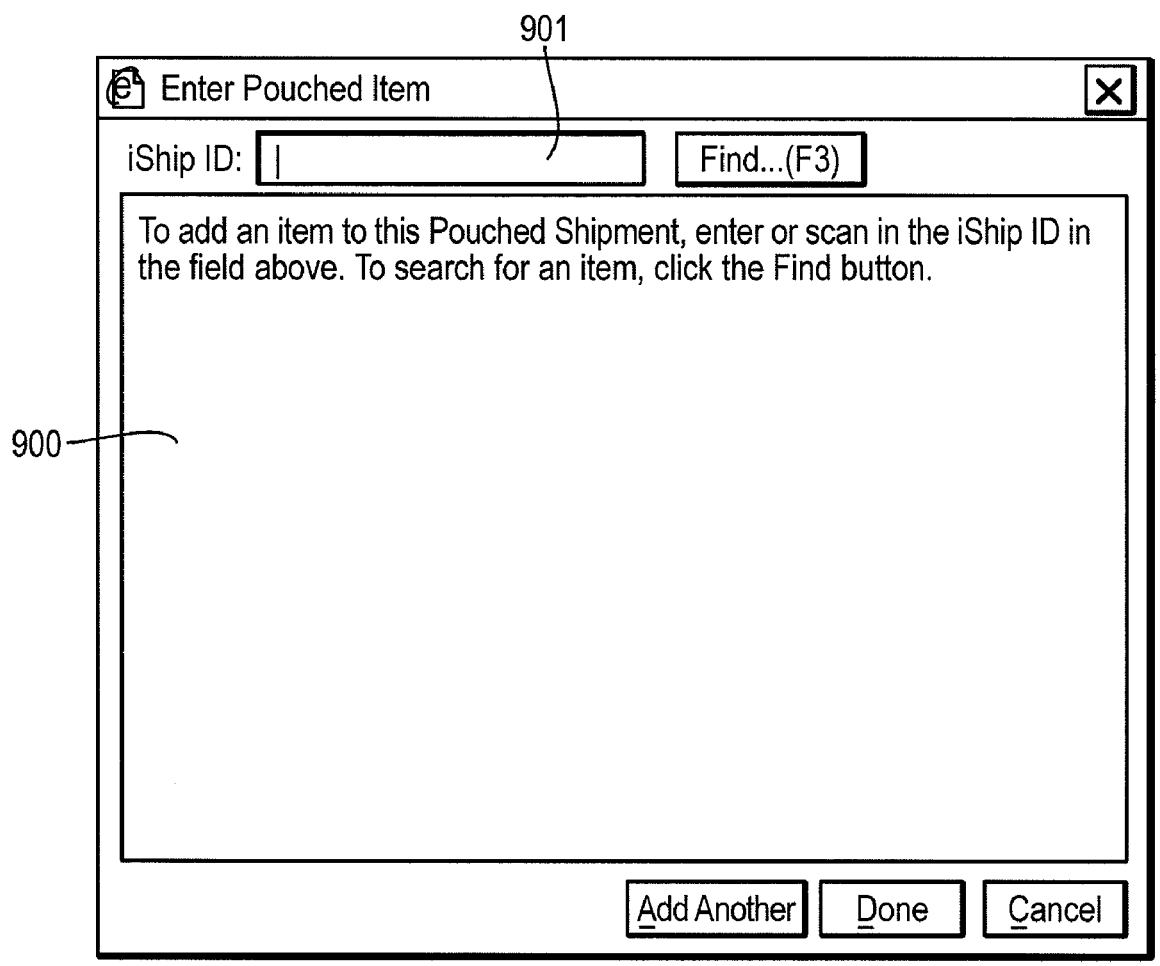

The package is then forwarded to a sender to complete the processing of the package. According to various embodiments, the sender may be mailroom personnel located at the original sender's place of business or personnel at a public shipping store (e.g., UPS Store, FedEx Kinko's, or U.S. Post Office). The sender receives the package and enters the package identifier into a second client application, such as the web-based Professional Shipping Station application or the Counter Manifest System provided by iShip, Inc., via a computing device, and the package identifier is transmitted over the Internet to the aggregation server 200. The package identifier may be entered, for example, by scanning the label or manually entering the package identifier printed on the label. FIG. 9 illustrates an exemplary enter item dialog box 900 into which the sender enters the package identifier for the package to be added to the pouch. The package identifier may be manually entered or scanned into text box 901.

Figure 10:
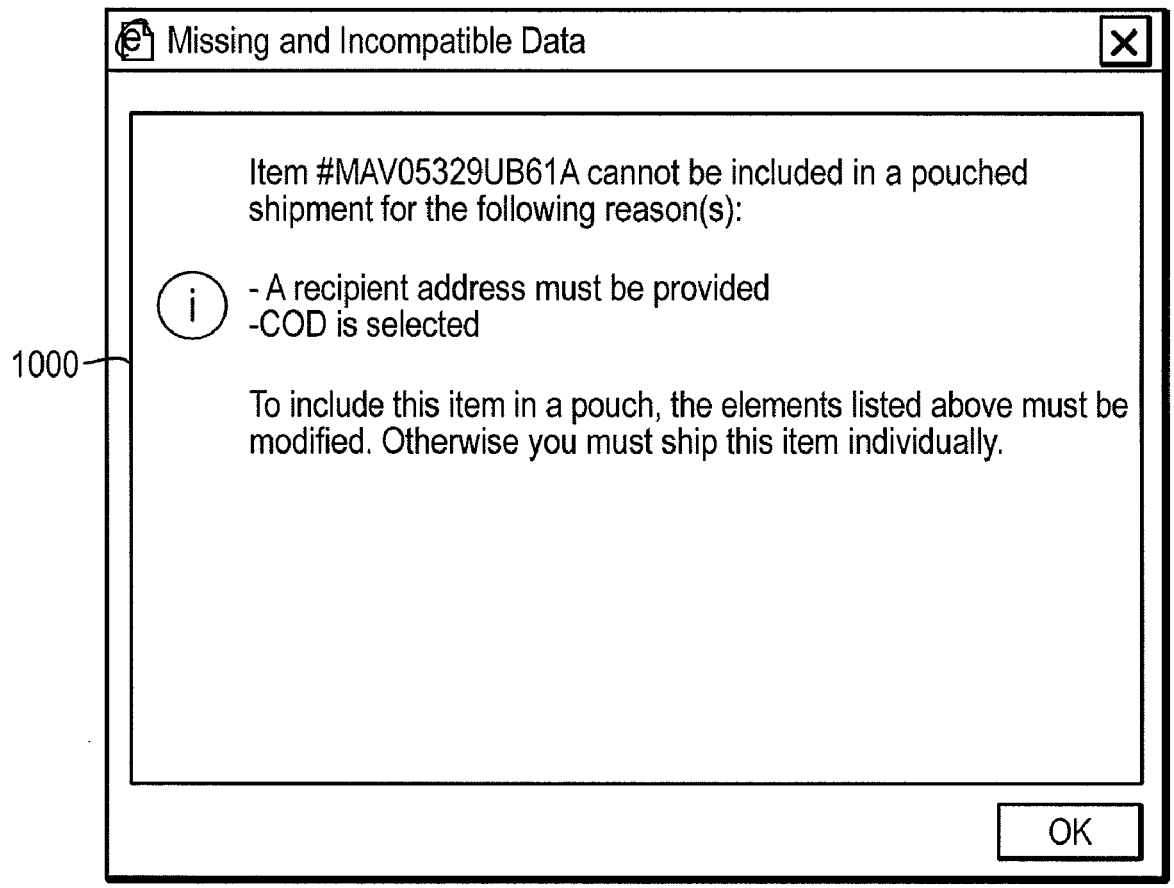
Figure 11:
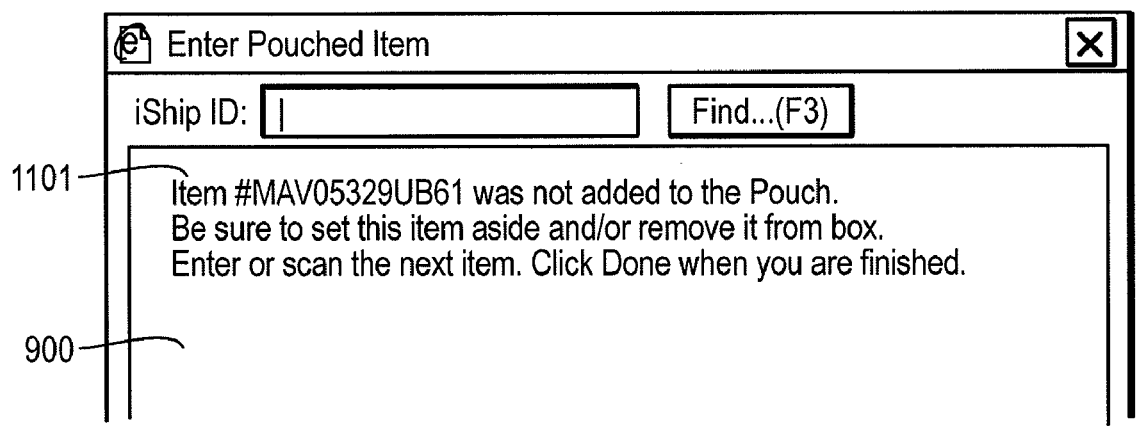
Figure 12:
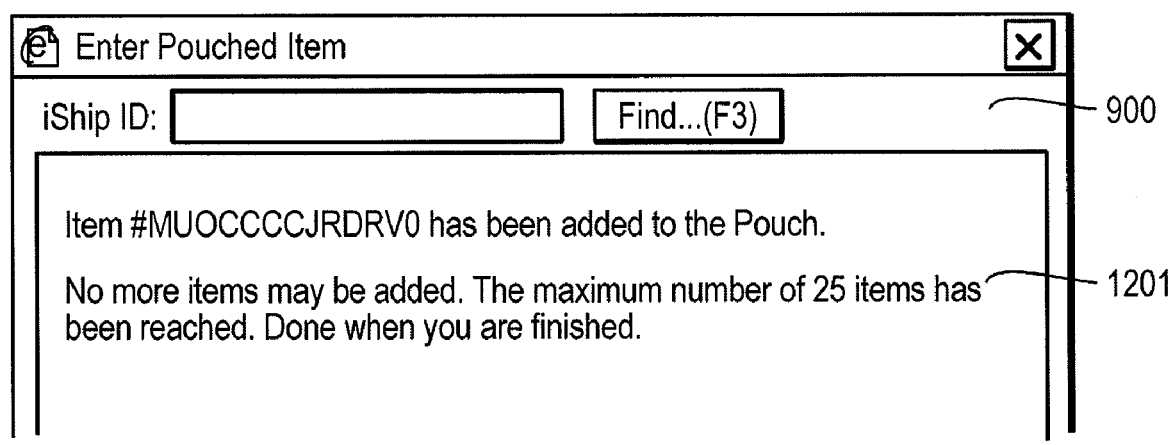

As discussed above in relation to FIG. 4, the compatibility module 300 receives the package identifier and retrieves the package details stored with the package identifier. In addition, the compatibility module 300 retrieves a pouching template associated with the pouch and compares the package details with the pouching template. If the package details for the package match any of the incompatibility factors defined in the pouching template, the compatibility module 300 generates and displays an error message for the sender indicating that the package cannot be included in the pouch. FIG. 10 illustrates an exemplary error message dialog box 1000 that includes an error message indicating that the package cannot be included in the pouch and listing the package details that are incompatible with the pouching template. In addition, as shown in FIG. 11, the compatibility module 300 may further display a note 1101 in the enter item dialog box 900 indicating that the package identifier previously entered was not added to the pouch manifest and reminding the sender to set the package aside and/or physically remove it from the pouch. Furthermore, if the package requested to be added would cause the pouch to exceed its maximum number of packages, the compatibility module 300 generates and displays an error message for the sender indicating that the package cannot be included in the pouch. FIG. 12 illustrates an exemplary error message 1201 displayed in the enter item dialog box 900 indicating that no additional packages may be added and the maximum number of packages has been reached.

Figure 13:
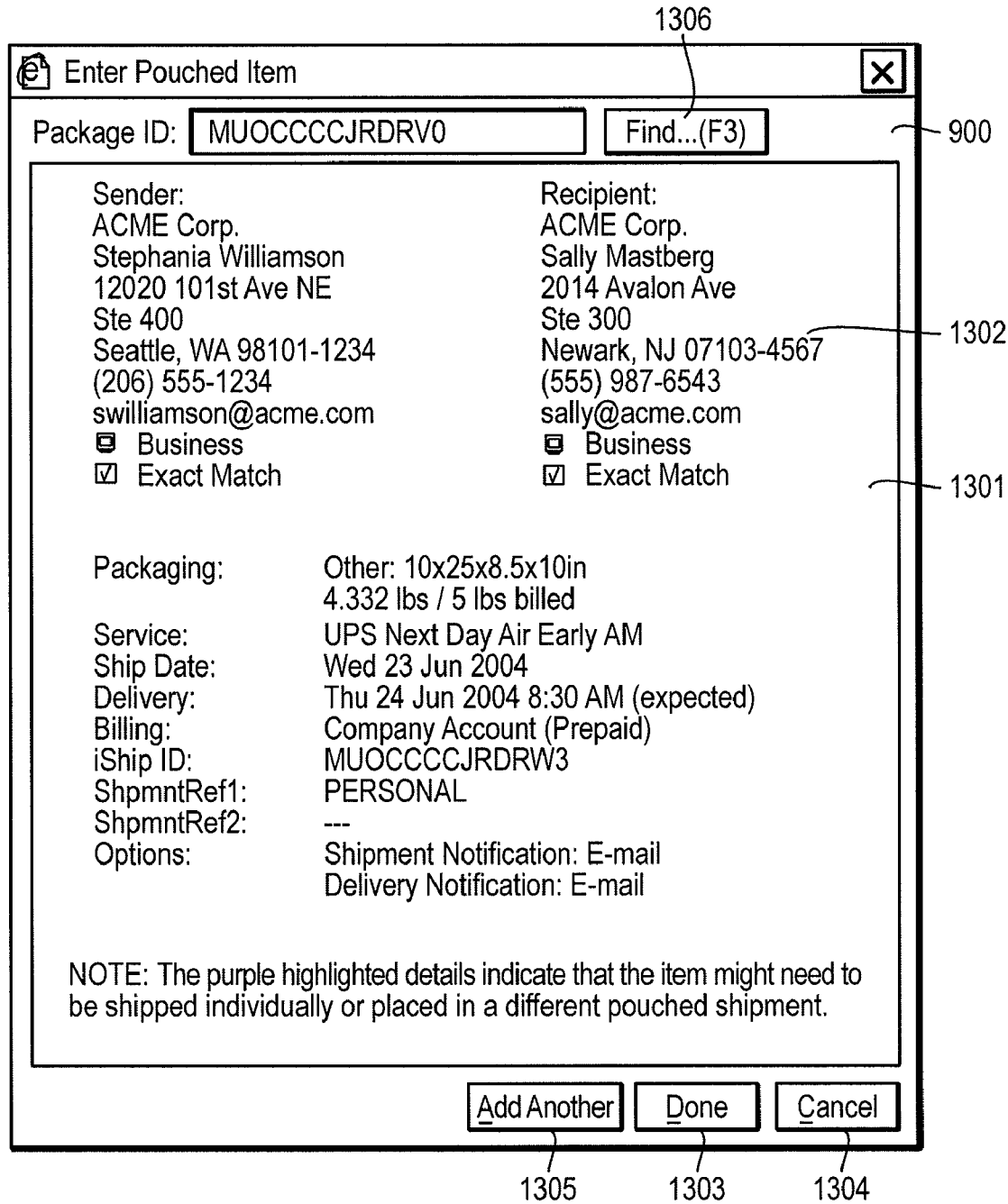

If the package details for the package do not match any of the incompatibility factors defined in the pouching template, the compatibility module 300 compares the package details to the questionable compatibility factors stored in the pouching template. If the package details match any of the questionable compatibility factors, the compatibility module 300 may display the package details of the package in the enter item dialog box 900 and highlight the package detail(s) meeting the questionable compatibility factor to allow the sender to confirm inclusion of the package identifier in the pouch manifest. FIG. 13 illustrates an exemplary enter item dialog box 900 showing the package details 1301 of a package in which the text 1302 of the package detail matching the questionable compatibility factor is highlighted. If the sender does not want to include the package in the pouch, the sender can select the "Cancel" button 1304, and the package identifier will not be added to the pouch manifest. However, if the sender does want to include the package in the pouch, the sender can select the "Done" button 1303 or the "Add Another" button 1305. In response to the selection of the "Done" button 1303 or the "Add Another" button 1305, the compatibility module 300 sends the package identifier to the item addition module 400. In addition, the enter item dialog box 900 includes a "Find" button 1306 that, when selected by the sender, displays a find item dialog box such as the find item dialog box 1600 shown in FIG. 16 and which is discussed in more detail below.

The selection of the "Add Another" button 1305 allows the sender to enter a new package identifier into the enter item dialog box 900, and the selection of the "Done" button 1303 prompts the item addition module 400 to display the package identifiers included in the pouch manifest. For example, FIG. 14 illustrates a pouch manifest dialog box 1400 according to one embodiment that displays a listing 1401 of package identifiers included in the pouch manifest. In addition, the pouch manifest dialog box 1400 includes a ship to address for the pouch 1405, a ship date for the pouch 1406, delivery services and carrier for delivering the pouch and an expected delivery date for the pouch 1407, and the number of packages included in the pouch 1408. The pouch manifest dialog box 1400 further allows the sender to select a particular package identifier, and one or more package details associated with the selected package identifier is displayed in a package detail section 1402 of the dialog box 1400. If a package detail is flagged by the compatibility module 300 for matching one of the questionable compatibility factors, the package detail may be highlighted in the pouch manifest dialog box 1400. For example, in the embodiment shown in FIG. 14, the package details for the package associated with package identifier "MU0CCCCJRDRW3" are highlighted because the zip+4 code from the package does not match the zip+4 code of the pouch or the other packages included in the pouch. The sender may select the package identifier and a "Remove from Pouch" button 1403 to remove the package identifier from the pouch manifest, or the sender can select an "Add" button 1404 to add another package identifier to the pouch manifest.

Figure 15:
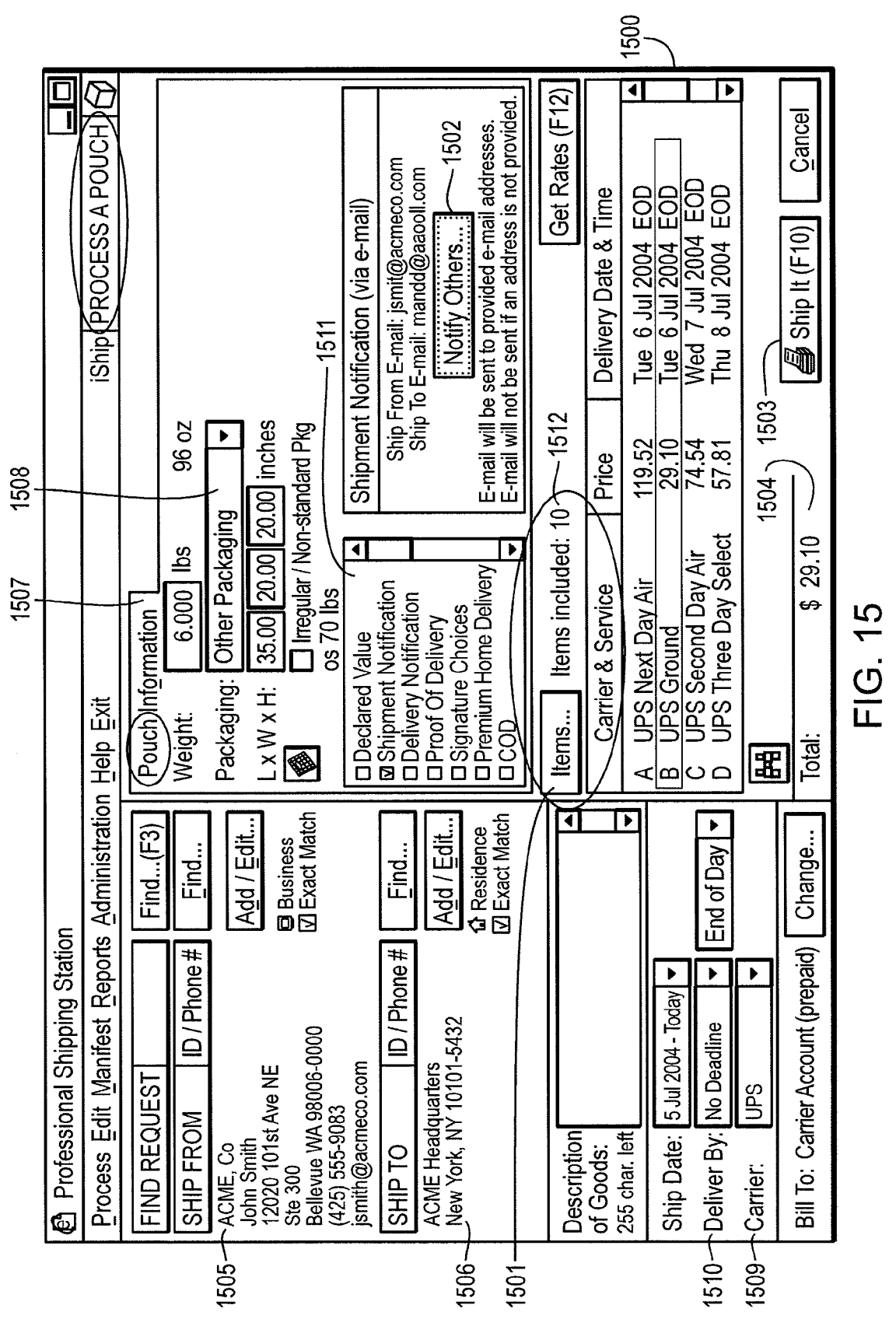

According to a particular embodiment, when the sender is ready to prepare the pouch for sending to a recipient, the sender utilizes a process pouch dialog box such as the process pouch dialog box 1500 shown in FIG. 15. The process pouch dialog box 1500 displays the ship from address of the pouch 1505, the ship to address of the pouch 1506, the weight and/or size of the pouch 1507, the type of packaging of the pouch 1508, a list of available carriers for delivering the pouch 1509, a list of available delivery service options provided by the carrier 1510, a list of available delivery notification options provided by the carrier 1511, and the number of items in the pouch 1512. In addition, the process pouch dialog box 1500 includes an "Items" button 1501 that, when selected by the sender, displays the pouch manifest dialog box 1400 listing the packages to be included in the pouch. Furthermore, the process pouch dialog box 1500 includes a "Notify Others" button 1502. This button 1502 is available for selection by the user when the "Shipment Notification" option is selected in the list of delivery notification options 1511, according to one embodiment. When the "Notify Others" button 1502 is selected, a text box (not shown) is displayed, and the user can enter email addresses that are to receive delivery and/or shipment notifications. Finally, the process pouch dialog box 1500 includes a "Ship It" button 1503 that, when selected by the sender, instructs the item addition module 400 to close the pouch manifest (i.e., no more packages can be added to the pouch) and print one or more shipping labels for the pouch. In addition, the the status of the pouch is changed from "current (open)" to "shipped." Although the status of the pouch may be changed to shipped, in a particular embodiment, the user can continue to edit the pouch manifest (e.g., add packages, remove packages) prior to manifesting the shipments for the selected carrier and physically turning over the pouch to the selected carrier. In another embodiment (not shown), the process pouch dialog box 1500 may further include a "save" button that, when selected, would save the options selected for the pouch, and the status of the pouch would remain "open" until the pouch manifest is completed.

The process pouch dialog box 1500 further includes a shipping rate estimate box 1504 that displays the estimated shipping rate for the pouch. If the shipping rates are prorated, the shipping rate determined by the rate modification module 500 is displayed in the box 1504.

Figure 16:
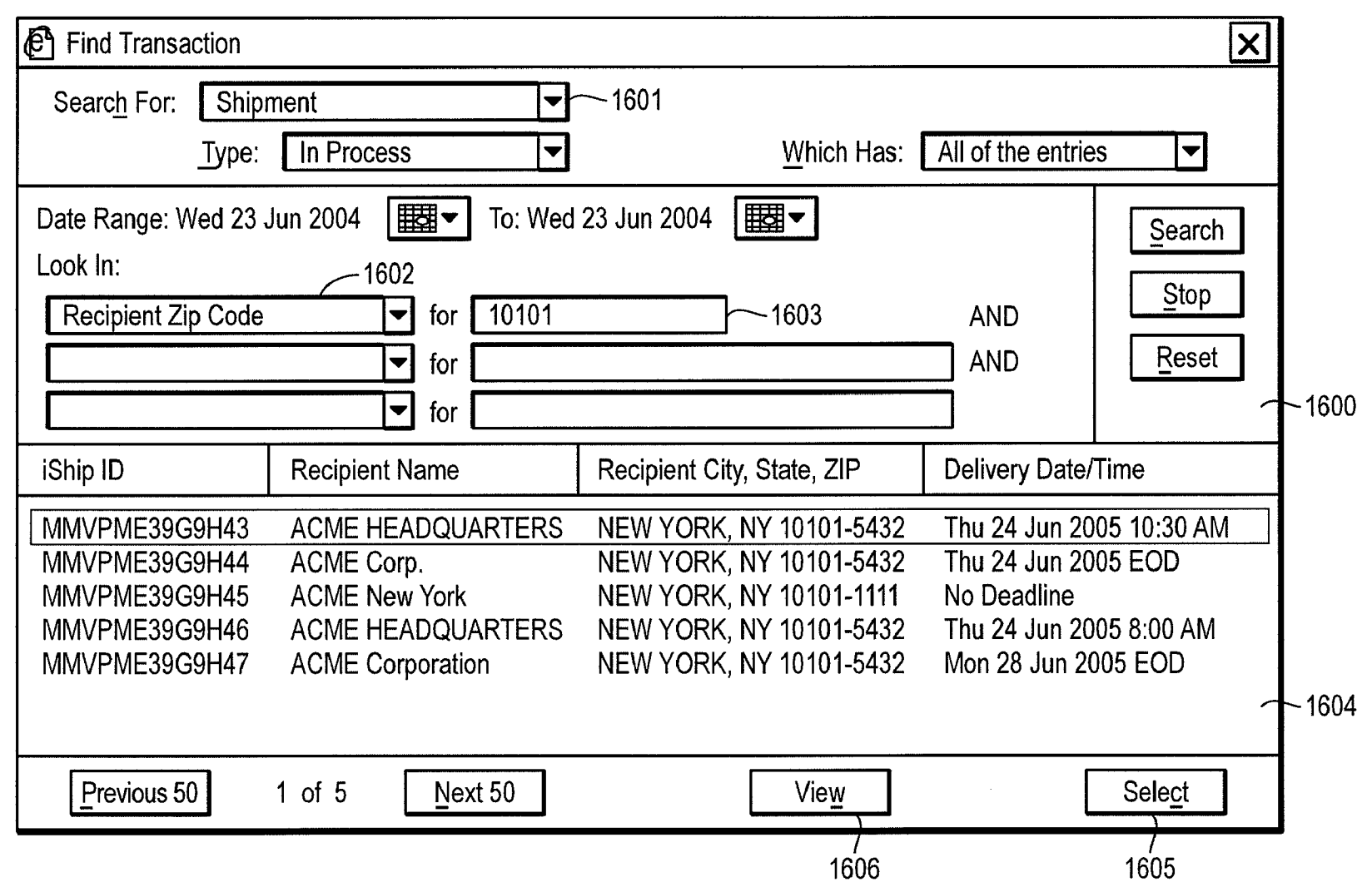

FIG. 16 illustrates an exemplary find item dialog box 1600 that allows the sender to search for a particular package identifier (or group of package identifiers) to add to the pouch manifest. For example, the find item dialog box 1600 includes a drop down box 1601 for selecting the type of item to be found (e.g., package (shipment), pouched package, pouch), a drop down box 1602 for selecting a field where a search term should be found (e.g., address, recipient name, zip code, etc.), and a text box 1603 for entering the search term. The find item dialog box 1600 also includes a results window 1604 that displays the search results. In the example embodiment shown in FIG. 16, the search results include the package identifier, the recipient's name, the recipient's city, state, and zip code, and the delivery date and time. The sender can select one or more of the search results and select the "View" button 1606 to view package details about the selected package or the "Select" button 1605 to add the selected package identifier to the pouch manifest.

In various alternative embodiments, the pre-processing application and the pouching application may be executed locally on computing devices.

Alternative Exemplary System Operation

FIG. 17 illustrates the steps executed by a system for processing a package according to an alternative embodiment of the invention. Beginning at Step 1701, at least a portion of package details associated with a package to be shipped to an ultimate recipient is received. The portion of package details includes, for example, an identity and address associated with an ultimate recipient and a billing option. Next, at Step 1703, a pouching template is retrieved from a memory location (e.g., a database) that identifies one or more incompatibility factors for a pouch. The portion of package details are then compared with the incompatibility factors identified in the pouching template, which is shown as Step 1709. If the portion of package details does not match one or more incompatibility factors, a first list of carriers and delivery service options selectable by a user for shipping the package is displayed as shown in Step 1711. The first list includes an option to ship the package in a pouch. However, if the portion of package details does match one or more of the incompatibility factors, a second list of carriers and delivery service options selectable by the user for shipping the package is displayed as shown in Step 1712. The second list does not include an option to ship the package in a pouch.

CONCLUSION

Many modifications and other embodiments of the invention will come to mind to one skilled in the art to which this invention pertains having the benefit of the teachings presented in the foregoing descriptions and the associated drawings. For example, while various examples are described above in regard to the payoff of a vehicle loan or lease, the system may be configured to facilitate other types of transactions, such as the payoff of other types of loans or financial obligations. Accordingly, it is to be understood that the invention is not to be limited to the specific embodiments disclosed and that modifications and other embodiments are intended to be included within the scope of the invention. Although specific terms are employed herein, they are used in a generic and descriptive sense only and not for the purposes of limitation.

The invention claimed is:

1. A system for identifying two or more packages to consolidate into a pouch in a shipping environment, said system comprising a memory and a processor, the processor configured for:
   receiving package details associated with a first package to be shipped to a first ultimate recipient, the package details comprising a first unique identifier identifying the first package, one or more delivery service options for the first package, and an address of the first ultimate recipient;
   retrieving a pouching template from the memory, the pouching template identifying one or more incompatibility factors for a pouch wherein the one or more incompatibility factors comprise a predetermined list including one or more delivery service options selected from a group consisting of: cash-on-delivery (COD), hold for pickup, certified mail, return service, verbal confirmation of delivery, and return receipt;
   comparing the one or more delivery service options for the first package with the incompatibility factors identified in the pouching template;
   in response to the one or more delivery service options for the first package not matching one or more of the incompatibility factors, electronically adding the first unique identifier to a pouch manifest associated with the pouch;
   receiving package details associated with a second package to be shipped to a second ultimate recipient, the package details associated with the second package comprising a second unique identifier identifying the second package, one or more delivery service options for the second package, and an address of the second ultimate recipient;
   comparing the package details associated with the second package with the incompatibility factors identified in the pouching template; and
   in response to the package details associated with the second package not matching one or more of the incompatibility factors, electronically adding the second unique identifier identifying the second package to the pouch manifest associated with the pouch,
   wherein the address of the first ultimate recipient and the address of the second ultimate recipient are different.

2. The system of claim 1 wherein the processor is further configured for displaying a message indicating that the first package should not be added to the pouch in response to the package details associated with the first package matching at least one of the incompatibility factors.

3. The system of claim 1 wherein the pouching template further identifies one or more questionable compatibility factors for the pouch, and the processor is further configured for:
   comparing the package details associated with the first package with the questionable compatibility factors identified in the pouching template; and
   in response to the package details associated with the first package matching at least one questionable compatibility factor and not matching one or more incompatibility factors, flagging at least the first unique identifier.

4. The system of claim 3 wherein flagging at least the first unique identifier comprises highlighting at least the first unique identifier in the pouch manifest.

5. The system of claim 3 wherein flagging at least the first unique identifier comprises changing the font of at least the first unique identifier in the pouch manifest.

6. The system of claim 1 wherein the pouching template further identifies one or more questionable compatibility factors for the pouch, and the processor is further configured for:
- comparing the package details associated with the first package with the questionable compatibility factors identified in the pouching template; and
- in response to the package details associated with the first package matching at least one questionable compatibility factor and not matching one or more incompatibility factors, prompting a user to confirm whether the first package should be included in the pouch.

7. The system of claim 6 wherein the processor is further configured for adding the first unique identifier to the pouch manifest in response to receiving confirmation from the user that the first package should be included in the pouch.

8. The system of claim 6 wherein one or more questionable compatibility factors is selected from a group comprising the following service options: declared value, no signature required, signature required, adult signature required, and proof of delivery.

9. The system of claim 8 wherein one or more questionable compatibility factors comprises a delivery date and time for the first package that is earlier than a delivery date and time for the pouch.

10. The system of claim 8 wherein one or more questionable compatibility factors comprises a ship date and time for the first package that is earlier than a ship date and time for the pouch.

11. The system of claim 8 wherein one or more questionable compatibility factors comprises a postal code for the first package that does not match a postal code for the pouch.

12. The system of claim 1 wherein the one or more incompatibility factors comprises one or more incompatible billing options.

13. The system of claim 12 wherein the one or more incompatible billing options comprises an option to pay for shipment on or after delivery.

14. The system of claim 1 wherein the one or more incompatibility factors comprises one or more address fields that are not completed.

15. The system of claim 1 wherein the pouching template further identifies one or more compatibility factors for the pouch and the processor is further configured for:
- comparing the package details associated with the first package with the one or more compatibility factors identified in the pouching template; and
- in response to the package details associated with the first package matching at least one compatibility factor and not matching one or more incompatibility factors, adding the first unique identifier to the pouch manifest.

16. The system of claim 15 wherein the one or more compatibility factors comprises one or more compatible delivery notifications.

17. The system of claim 15 wherein the one or more compatibility factors comprises one or more compatible shipping carriers.

18. The system of claim 15 wherein the one or more compatibility factors comprises one or more compatible delivery services.

19. The system of claim 1 wherein the processor is further configured for modifying a shipping rate associated with the first package in response to adding the first unique identifier to the pouch manifest.

20. The system of claim 1 wherein the processor is further configured for prompting a user to physically add the first package to the pouch in response to the package details associated with the first package not matching the one or more incompatibility factors.

21. The system of claim 1 wherein the pouching template further identifies a maximum number of packages to be included in the pouch and the processor is further configured for:
- comparing the number of package identifiers included in the pouch manifest with the maximum number of packages to be included in the pouch; and
- in response to the number of package identifiers included in the pouch manifest being less than the maximum number of packages to be included in the pouch, adding the first unique identifier to the pouch manifest.

22. The system of claim 1 wherein the pouching template further identifies a maximum weight for the pouch and the processor is further configured for:
- estimating a weight for the pouch by adding the weight of the first package to the sum of the weight of one or more packages having package identifiers included in the pouch manifest;
- comparing the estimated weight for the pouch with the maximum weight of the pouch; and
- in response to the estimated weight being less than or equal to the maximum weight of the pouch, adding the first unique identifier to the pouch manifest.

23. The system of claim 1 wherein the address of the first ultimate recipient or the address of the second ultimate recipient are the same as an address of a third ultimate recipient of a third package.

24. The system of claim 1 wherein the first ultimate recipient and the second ultimate recipient are the same person.

25. The system of claim 1 wherein the processor is further configured for receiving a request from the user to remove the first package identifier from the pouch manifest.

* * * * *